United States Patent [19]

Johansen et al.

[11] Patent Number: 5,135,576
[45] Date of Patent: Aug. 4, 1992

[54] COMBINED STRUCTURES OF CERAMIC MATERIALS AND SUPER CONCRETE

[75] Inventors: Knut Johansen; Øyvind Larsen; Terje Nilsen, all of Kristiansand, Norway

[73] Assignee: Elkem a/s, Norway

[21] Appl. No.: 600,016

[22] Filed: Oct. 18, 1990

[30] Foreign Application Priority Data

Nov. 2, 1989 [NO] Norway .................................. 894355

[51] Int. Cl.$^5$ ............................. C04B 7/00; C04B 7/32
[52] U.S. Cl. .................................... 106/638; 106/691; 106/692; 106/737; 428/698; 428/703; 501/124
[58] Field of Search ................ 428/703, 698; 501/124; 106/691, 692, 737, 638; 51/308

[56] References Cited

U.S. PATENT DOCUMENTS

| | | |
|---|---|---|
| 4,588,443 | 5/1986 | Bache . |
| 4,595,664 | 6/1986 | Nishino et al. .................. 501/124 |
| 4,780,141 | 10/1988 | Double et al. .................. 106/691 X |
| 4,797,319 | 1/1989 | Yoshida et al. .................. 428/703 |
| 4,943,544 | 7/1990 | McGarry et al. .................. 501/124 |
| 4,961,786 | 10/1990 | Novinson .................. 501/124 X |

FOREIGN PATENT DOCUMENTS

| | | | |
|---|---|---|---|
| 0041916 | 4/1979 | Japan | ................... 428/703 |
| 142519 | 7/1976 | Norway . | |

OTHER PUBLICATIONS

"Ceramic Bulletin" 1971, Precision Cast 92-97% Alumina Ceramics Bonded with Calcium Aluminate Cement—Heilich et al.—pp. 548-554.

Primary Examiner—Karl Group
Attorney, Agent, or Firm—Lucas & Just

[57] ABSTRACT

The present invention relates to combined structures of ceramic material and super concrete, which structures comprise an outer layer of ceramic material bonded to an internal structure of super concrete or an outer structure of super concrete bonded to an inner layer of ceramic material.

The ceramic material is selected among any class of inorganic non-metallic products which are subjected to a temperature of 540° C. and above during manufacture or use, while the super concrete comprises densely packed particles of inorganic materials embedded in a matrix based on an hydraulic cement and having a strength of at least 70 MPa.

19 Claims, No Drawings

COMBINED STRUCTURES OF CERAMIC MATERIALS AND SUPER CONCRETE

The present invention relates to combined structures of ceramic materials and super strength concrete.

Ceramic materials have a lot of advantageous properties such as: low weight, high strength, stiffness, hardness, resistance to abrasive and erosive wear, corrosion and high temperature.

However, ceramic materials also have some disadvantages such as high price and special production and processing problems limiting the cost effectiveness especially when it comes to complex shapes and large parts. The main disadvantageous property of ceramic materials is their brittleness causing them to fail before any noticeable yield or plastic flow as with metals. As a consequence ceramic materials are susceptible to surface damage.

By ceramic materials it is here understood any class of inorganic, non-metallic products, which are subjected to a temperature of 540° C., and above, during manufacture or use, including metallic oxides, borides, carbides or nitrides and mixtures or compounds of such materials. This definition is adopted from O'Bannon: Dictionary of Ceramic Science and Engineering. Plenum Press New York, 1984.

The ceramic materials are made by different shaping techniques such as slip casting, extrusion, injection moulding, tape casting, roll forming and uniaxial as well as isostatic pressing, and by different heat treatment processes such as vacuum, inert gas, atmospheric and gas pressure sintering, uniaxial and isostatic hot pressing, reaction bonding, infiltration, flame and plasma spraying. The ceramic materials may comprise different phases: Crystalline, amorpheous, solid solutions and ceramic or metallic fibers embedded in a ceramic matrix. The ceramic materials include dense as well as porous materials and surface treated materials.

Typical well known examples of ceramic materials according to the above definition are alumina containing 85-100% aluminium oxide, partially and fully stabilized zirconia, zirconia toughened alumina, silicon infiltrated silicon carbide, sintered silicon carbide, reaction bonded silicon nitride, sintered silicon nitride, tungsten carbide, titanium diboride, aluminatitanium carbide composite, titanium carbide and boron nitride. Further examples are traditional ceramics like porcelain, cordierite, mullite, and spinel.

Also functional ceramics such as ferrites, titanates and ceramic high temperature superconductors are ment to fall within the above definition of ceramic materials.

In the later years there has been developed so-called super concretes which are concretes having a very high strength and which can be processed at room temperature and can be combined with virtually any material thus making production of cost effective complex components effective. These super concretes have some very advantageous properties, such as being highly wear resistant, temperature resistant, corrosion resistant, electrically insulating, dimensionably and thermally stable.

However, the super concrete materials also have some drawbacks, such as low tensile strength and low resistance to acidic environments.

By super concrete it is here understood a group of inorganic non-metallic materials made of densely packed, specially selected particles embedded in a very dense and strong matrix. The matrix is based on an hydraulic cement such as Portland or calcium aluminate cement or phosphate cement with addition of special "densifiers" such as microsilica. Special particles to obtain certain effects such as low thermal expansion (cordierite and lithium-zirconium phosphate), thermal or electrical conduction (metal particles or fibers), and magnetic properties (ferrites) may be incorporated in the super concrete. The super concretes used according to the present invention have a compression strength of at least 70 MPa and preferably above 120 MPa according to ASTM standard C39-86.

A typical super concrete mixture used in connection with the present invention comprises about 400 parts by weight of calcium aluminate cement, 96 parts by weight of microsilica with a mean particle size of 0.15 microns and a surface area of about 20 m$^2$/gram, 1147 parts by weight of bauxite (50% 1-4 mm and 50% 0-1 mm), added dispersants and accelerators to obtain a well dispersed mixture and favourable pouring and casting properties.

Materials sold under the trademarks CERAMITE and DENSIT are two classes of superconcrete which can be used in connection with the present invention. Their strength properties approach those of traditional ceramics in the high end and exceeds those of high strength concrete in the low end. These materials can be processed at room temperature and can be combined with virtually any material thus making production of cost effective complex components possible.

The particles embedded in the matrix of the super concrete may be of virtually any inorganic material, the more typical being quartz, aluminium oxide, bauxite, silicon carbide and different silicates applied to give strength and high wear resistance.

It is an object of the present invention to provide combined structures of ceramic materials and super concrete whereby the properties of the two different materials are combined in a synergistic and cost effective way.

Accordingly, the present invention relates to combined structures of ceramic material selected among any class of inorganic, non-metallic products which are subjected to a temperature of 540° C. and above during manufacture or use and a super concrete comprising densely packed particles of inorganic materials embedded in a matrix based on hydraulic cement and having a strength of at least 70 MPa, which structures comprise an outer layer of ceramic material bonded to an internal structure of super concrete, or an outer structure of super concrete bonded to an inner layer of ceramic material.

The combined structures according to the present invention, can be utilized for a large number of finished products which make it possible to produce the products more cost effectively than before, and which gives products with better overall properties than before. As examples of products which can be made utilizing the advantages of the present invention the following products can be mentioned:

Tiles comprising a structure of super concrete to which structure there on at least one side is applied a layer of ceramic material.

Pipes consisting of an inner tube of super concrete and an outer layer of ceramic material and pipes consisting of an inner ceramic tube with an outer protection of super concrete.

Ceramic capacitors in the form of a ceramic tube having an outer electrically insulating, and protecting layer of super concrete.

Valve balls comprising an inner part of super concrete with a surface layer of ceramic materials.

Monoscrews comprising an inner part of super concrete having a surface layer of ceramic material.

The combined structures according to the present invention are normally made by first forming and finishing the ceramic part of the structure by any conventional process as one or more pieces having the optimal wall thickness. The super concrete is then cast into or onto the ceramic part or parts according to the conditions given by the over-all design. In this way very complex and large shapes can be produced which are not possible to make from ceramic materials alone in a cost effective way. Alternatively the ceramic layer can be applied to the cured super concrete structure by plasma spraying or flame spraying.

A further advantage of the combined structures according to the present invention is that fixing devices such as steel bolts can be cast partly into the super concrete part of the structures. In this way the structures can be easily affixed to other structures. This is normally not possible to obtain by ceramic materials alone as it is not possible to insert for example steel bolts during production of a ceramic material.

EXAMPLE 1

A combined structure according to the present invention in the form of paddles for use in mechanical mixers working on highly abrasive and corrosive pasty mixtures was made in the following way: A 5 mm thick shell of 99.8% alumina was made by slip casting. The outer surface of the ceramic shell corresponded to the shape of the paddle. A super concrete mixture comprising 400 parts by weight of calcium aluminate cement, 96 parts by weight of microsilica 1147 parts by weight of bauxite filler (50% 1-4 mm and 50% 0-1 mm), dispersants and accelerators was cast into the ceramic shell. Steel bolts for connection of the paddle to the mixer arm were inserted and kept in position in the super concrete. The concrete was allowed to cure for 24 hours. The paddle made according to the present invention showed excellent wear and corrosion properties compared to conventional paddles made from stainless steel. It should be appreciated that paddles made from only ceramics would not be possible to use both due to the very high costs and due to design problems.

EXAMPLE 2

This example relates to a combined structure of an outside super concrete body on an inner shell of ceramic material, which is used in connection with a sensor configuration for flow measure means.

A cold isostatically pressed straight tube of 8 mm wall thickness made of zirconia toughened alumina (40% partially stabilized zirconia, 60% alumina) was produced. Special electrodes were applied on the outside surface.

A layer of super concrete of the same composition as used in example 1, was cast into the cavity between the outside surface of the ceramic tube and an outside steel pipe, thus protecting the electrodes and insulating them electrically and at the same time fixing the ceramic tube to the steel pipe.

Several significant advantages are provided by this structure. An inner surface of highly wear resistant material in a steel pipe is provided without any shrink fitting procedure that would also destroy the electrode system. The application of a super concrete body gives substantially higher temperature resistance and space filling capability than any known glue concepts, still providing stability and stiffness. By applying the super concrete, the electrodes on the outside of the ceramic tubes are also electrically insulated from the steel pipe.

EXAMPLE 3

This example relates to a ball valve for use in an abrasive and corrosive media, and especially for ball valves having a diameter of 40 mm and above. The outer surface of such ball valves has to fullfill very strict requirements to surface smoothness. Further such ball valves made completely from ceramic materials tend to be expensive and difficult to produce especially when it comes to the larger sizes. According to the present invention it was made a shell of zirconia-aluminia composite by conventional methods. The shell was filled with a super concrete of the composition described in example 1. The produced ball valve had excellent toughness, and a very good wear resistance.

EXAMPLE 4

This example relates to the manufacture of a monopump screw consisting of an outer shell of a highly wear and corrosion resistant ceramic outer shell of 5 mm thickness made from reaction bonded silicon nitride and a core of super concrete of the composition described in example 1 with a steel bolt joiner inserted in one end of the screw. By slip casting the ceramic, any machining of the outer surface of the monoscrew is avoided, resulting in favourable production costs and better performance of the screw. The costs for producing a monopump screw made from ceramic material alone will be much higher due to raw material costs and higher production costs.

We claim:
1. A composite structure comprising:
    (a) a super concrete base structure made from a mix comprising hydraulic cement, microsilica, and inorganic particles selected from the group consisting of quartz, aluminium oxide containing particles silicon carbide, and silicates, said mix having a compression strength of at least 70 MPa after hardening; and
    (b) a ceramic material layer separate from and bonded to said super concrete base structure, said ceramic material layer made from an inorganic, non-metallic material which was subject to a temperature of 540° C. and above in order to form said ceramic surface layer, said inorganic, non-metallic material selected from the group consisting of metallic oxides, borides, carbides, nitrides and mixtures thereof.

2. The composite structure according to claim 1 wherein the ceramic material layer is formed by a method selected from the group consisting of slip casting, extrusion, injection molding, tape casting, roll forming, uniaxial pressing and isostatic pressing.

3. The composite structure according to claim 1 wherein the ceramic material layer contains an element selected from the group consisting of ceramic fibers, metallic fibers, platelets, and particles.

4. The composite structure according to claim 1, characterized in that the super concrete has a compression strength of at least 120 MPa.

5. The composite of claim 1 wherein the hydraulic cement is Portland cement, calcium aluminate cement or phosphate cement.

6. The composite of claim 1 wherein the super concrete comprises about 400 parts by weight calcium aluminate cement, about 90 parts by weight microsilica, with a mean particle size of 0.15 microns and a surface area of about 20 m$^2$/gram, about 1147 parts by weight bauxite, dispersants and accelerators.

7. The composite of claim 1 wherein the ceramic material layer has a wall thickness of 5 mm and is made of alumina by means of slip casting.

8. A composite structure comprising:
(a) a preformed ceramic shell made from a material selected from the group consisting of metallic oxides, borides, carbides, nitrides and mixtures thereof, and made in a process in which said ceramic material is subject to a temperature of about 540° C. and above to form said ceramic shell; and
(b) a super concrete made from a mix of hydraulic cement, microsilica and inorganic particles selected from the group consisting of quartz, aluminum oxide containing particles, silicon carbide and silicates wherein said mix is poured into said preformed ceramic shell and in which said mix hardens to a compression strength of at least about 70 MPa such that said super concrete is bonded to and separate from said ceramic shell.

9. The composite of claim 8 wherein the hydraulic cement is Portland cement, calcium aluminate cement or phosphate cement.

10. The composite of claim 8 wherein the super concrete comprises about 400 parts by weight calcium aluminate cement, about 90 parts by weight microsilica, with a mean particle size of 0.15 microns and a surface area of about 20 m$^2$/gram, about 1147 parts by weight bauxite, dispersants and accelerators.

11. The composite of claim 8 wherein the ceramic shell has a wall thickness of 5 mm and is made of alumina by means of slip casting.

12. A composite structure comprising:
(a) a super concrete base structure made from a mix comprising hydraulic cement, microsilica, an inorganic particle selected from the group consisting of quartz, aluminum oxide containing particles, silicon carbide, and silicates, and one or more components selected from the group consisting of cordierite, lithium-zirconium phosphate, metal particles, metal fibers and ferrites, said mix having a compression strength of at least 70 MPa after hardening; and
(b) a ceramic material layer bonded to said super concrete base structure, said ceramic material layer made from an inorganic, non-metallic material which was subject to a temperature of 540° C. and above in order to form said ceramic surface layer, said inorganic, non-metallic material selected from the group consisting of metallic oxides, borides, carbides, nitrides and mixtures thereof.

13. The composite of claim 12 wherein the hydraulic cement is Portland cement, calcium aluminate cement or phosphate cement.

14. The composite of claim 13 wherein the super concrete comprises about 400 parts by weight calcium aluminate cement, about 90 parts by weight microsilica, with a mean particle size of 0.15 microns and a surface area of about 20 m$^2$/gram, about 1147 parts by weight bauxite, dispersants and accelerators.

15. The composite of claim 14 wherein the ceramic material has a wall thickness of 5 mm and is made of alumina by means of slip casting.

16. A composite structure comprising:
(a) a preformed ceramic shell made from a material selected from the group consisting of metallic oxides, borides, carbides, nitrides and mixtures thereof, and made in a process in which said ceramic material is subject to a temperature of about 540° C. and above to form said ceramic shell; and
(b) a super concrete made from a mix of hydraulic cement, microsilica, an inorganic particle selected from the group consisting of quartz, aluminium oxide containing particles, silicon carbide and silicates, and one or more components selected from the group consisting of cordierite, lithium-zirconium phosphate, metal particles, metal fibers and ferrites, wherein said mix is poured into said preformed ceramic shell and in which said mix hardens to a compression strength of at least about 70 MPa.

17. The composite of claim 16 wherein the hydraulic cement is Portland cement, calcium aluminate cement or phosphate cement.

18. The composite of claim 17 wherein the super concrete comprises about 400 parts by weight calcium aluminate cement, about 90 parts by weight microsilica, with a mean particle size of 0.15 microns and a surface area of about 20 m$^2$/gram, about 1147 parts by weight bauxite, dispersants and accelerators.

19. The composite of claim 18 wherein the ceramic shell has a wall thickness of 5 mm and is made of alumina by means of slip casting.

* * * * *